United States Patent
Chen

(10) Patent No.: US 9,027,397 B2
(45) Date of Patent: May 12, 2015

(54) TIRE PRESSURE SENSOR APPLICABLE TO DIFFERENT WHEEL RIMS

(71) Applicant: Hsin-Chieh Chen, Taichung (TW)

(72) Inventor: Hsin-Chieh Chen, Taichung (TW)

( * ) Notice: Subject to any disclaimer, the term of this patent is extended or adjusted under 35 U.S.C. 154(b) by 64 days.

(21) Appl. No.: 13/890,677

(22) Filed: May 9, 2013

(65) Prior Publication Data

US 2014/0331759 A1 Nov. 13, 2014

(51) Int. Cl.
 *B60C 23/02* (2006.01)
 *G01M 17/02* (2006.01)
 *G01L 17/00* (2006.01)

(52) U.S. Cl.
 CPC ..................... *G01L 17/00* (2013.01)

(58) Field of Classification Search
 USPC ....................................... 73/146.5
 See application file for complete search history.

(56) References Cited

U.S. PATENT DOCUMENTS

| | | | | |
|---|---|---|---|---|
| 2003/0079537 A1* | 5/2003 | Luce | ................ | 73/146 |
| 2006/0272402 A1* | 12/2006 | Yin et al. | ............. | 73/146.8 |
| 2008/0127724 A1* | 6/2008 | Qiu et al. | ............. | 73/146.8 |
| 2009/0064775 A1* | 3/2009 | Hui | .............. | 73/146.8 |
| 2010/0095756 A1* | 4/2010 | Fukui et al. | ............. | 73/146.8 |
| 2012/0118057 A1* | 5/2012 | Rigney et al. | ............. | 73/146.8 |
| 2012/0304755 A1* | 12/2012 | Chuang et al. | ............. | 73/146.8 |
| 2013/0009762 A1* | 1/2013 | Yu et al. | ............. | 340/442 |
| 2013/0282232 A1* | 10/2013 | Medley et al. | ............. | 701/34.4 |

* cited by examiner

*Primary Examiner* — Lisa Caputo
*Assistant Examiner* — Jamel Williams
(74) *Attorney, Agent, or Firm* — Muncy, Geissler, Olds & Lowe, P.C.

(57) ABSTRACT

A tire pressure sensor includes a sensor device providing a first mounting hole and a second mounting hole in different angles and adapted for detecting the pressure of a tire at a wheel rim, an air valve mountable in a through hole at the wheel rim to guide the air pressure of the tire into the sensor device for sensing, and a fastener for selectively fastening the air valve to the first mounting hole or second mounting hole of the sensor device subject to the type of the wheel rim.

8 Claims, 8 Drawing Sheets

TIRE PRESSURE SENSOR APPLICABLE TO DIFFERENT WHEEL RIMS

BACKGROUND OF THE INVENTION

1. Field of the Invention

The present invention relates to tire pressure monitoring technology and more particularly to a tire pressure sensor that is applicable to different wheel rims.

2. Description of the Related Art

Having the proper tire pressure extends the life of the vehicle (car or motorcycle) tires, improves vehicle safety and fuel efficiency. Insufficient tire pressure can reduce the tire life and make the braking distance longer, and the vehicle handling can become wobbly. Overinflated tires are more prone to damage from impacts with small holes in the rod, and can impact the ride comfort of your vehicle.

To avoid the aforesaid problems, tire pressure sensors are created for mounting in the wheel rim to detect the pressure of the tire, enabling the driver to keep track of tire pressure condition, preventing over-inflation and under-inflation problems. Regular tire pressure sensors generally comprise an air valve and a sensor device. According to conventional designs, the air valve and the sensor device are fixedly connected together, i.e., the angle between the air valve and the sensor device is not adjustable. Thus, conventional tire pressure sensors are simply applicable to one specific type of wheel rims. A tire pressure sensor configured for installation in a wheel rim for sedan is not suitable for installation in a wheel rim for sports car or motorcycle. For enabling a tire pressure sensor to be selectively installed in different types of wheel rims, an extra mounting device will be necessary, complicating the installation and increasing the installation cost.

SUMMARY OF THE INVENTION

The present invention has been accomplished under the circumstances in view. It is the main object of the present invention to provide a tire pressure sensor, which comprises an air valve mountable in any of a variety of wheel rims, a sensor device for detecting the pressure of the tire at the installed wheel rim, and a fastener for selectively fastening the sensor device to the air valve in one of two different angular positions subject to the type of the installed wheel rim.

A tire pressure sensor in accordance with the present invention comprises a sensor device, an air valve, and a fastener. The sensor device is adapted for measuring the pressure of a tire, comprising a first mounting hole and a second mounting hole. The first mounting hole and the second mounting hole extend in different angles. Thus, the axis of the first mounting hole and the axis of the second mounting hole define a predetermined contained angle. The air valve is mountable in a through hole of a wheel rim, comprising an air intake tip and a tubular mounting rod respectively located at two opposite ends thereof. The fastener is adapted to selectively fasten the tubular mounting rod of the air valve to the first mounting hole or second mounting hole of the sensor device to hold the sensor device in one of two angular positions relative to the air valve. If the air valve is mounted in the first mounting hole of the sensor device, the air valve is kept in an inclined manner relative to the sensor device, allowing the tire pressure sensor to be installed in a wheel rim for sedan. If the air valve is mounted in the second mounting hole of the sensor device, the air valve is kept in vertical relative to the sensor device, allowing the tire pressure sensor to be installed in a wheel rim for sports car.

DETAILED DESCRIPTION OF THE INVENTION

Figure 1:
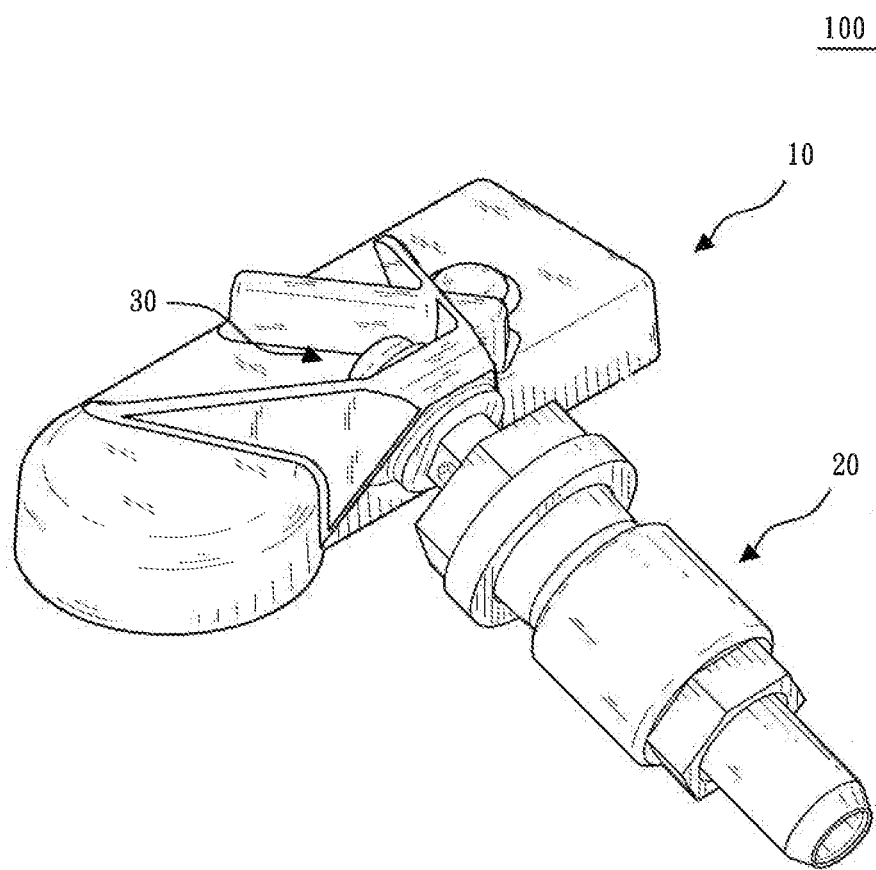
FIG. 1 is an elevational view of a tire pressure sensor in accordance with the present invention.
Figure 2:
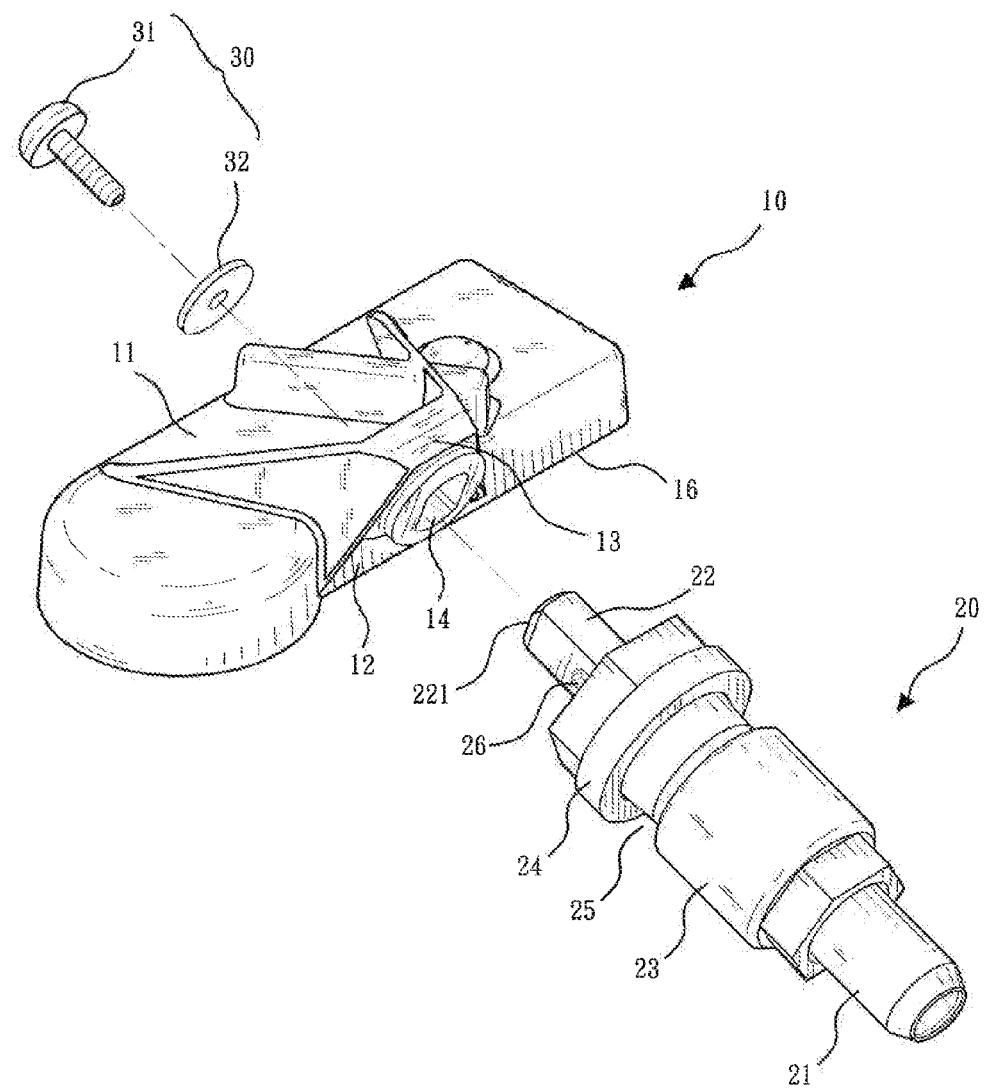
FIG. 2 is an exploded view of the tire pressure sensor in accordance with the present invention.
Figure 3:
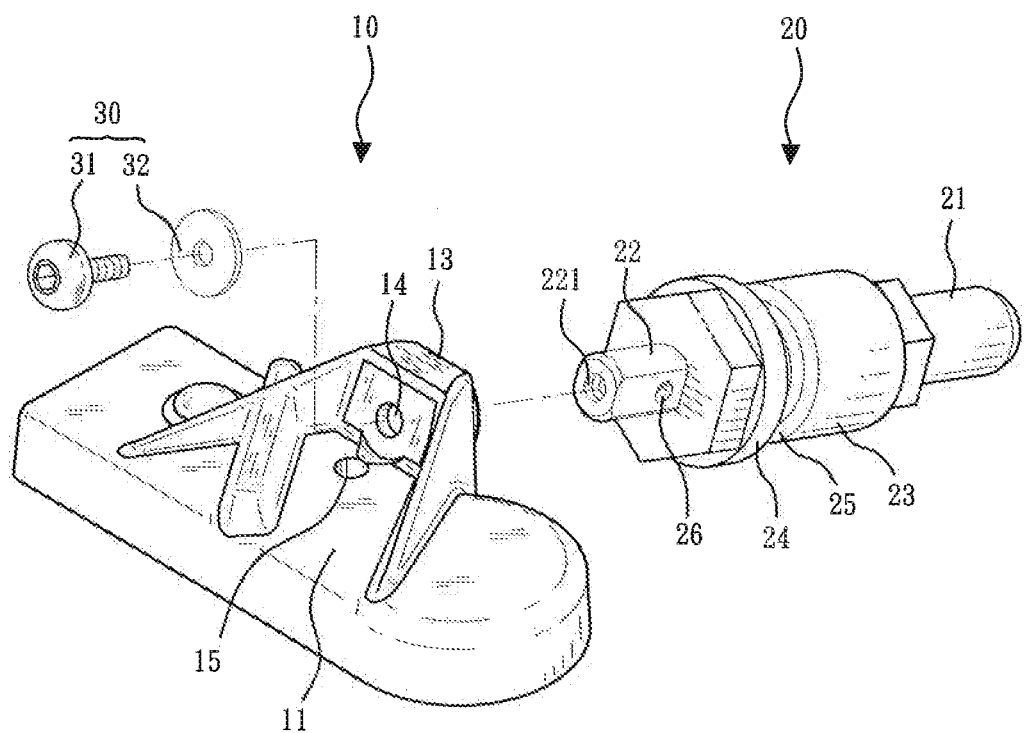
FIG. 3 corresponds to FIG. 2 when viewed from another angle.

Referring to FIGS. 1-3, a tire pressure sensor 100 in accordance with the present invention is shown. The tire pressure sensor 100 comprises a sensor device 10, an air valve 20, and a fastener 30.

The sensor device 10 comprises an electronic sensor module (not shown) mounted therein and adapted for measuring the pressure of a tire and transmitting the measured data wirelessly to an on-vehicle main unit (not shown), a mounting frame 13 protruded from a part between a top wall 11 and one sidewall 12 thereof, a first mounting hole 14 located in the mounting frame 13 and extending in an oblique direction relative to the top wall 11 and the sidewall 12, and a second mounting hole 15 extending through the top wall 11 and a bottom wall 16 thereof in a non-parallel manner relative to the first mounting hole 14. Thus, the axis of the first mounting hole 14 and the axis of the second mounting hole 15 define a predetermined contained angle smaller than 90-degrees. Further, the first mounting hole 14 and the second mounting hole 15 in this embodiment are countersunk holes.

The air valve 20 comprises an air intake tip 21 located at a front side thereof, a non-circular mounting rod 22 made in the shape of a tube and located at an opposite rear side thereof, a neck 25 spaced between the annular elastic collar 23 and the elastic stop member 24, an annular elastic collar 23 and an elastic stop member 24 fixedly arranged around the periphery thereof at two opposite sides of the neck 25 between the air intake tip 21 and the non-circular mounting rod 22, a screw hole 221 axially located at the distal end of the non-circular mounting rod 22, and an air hole transversely located at the periphery of the non-circular mounting rod 22 near the elastic stop member 24 and kept in air communication with the inside space of the air intake tip 21 for enabling air to be pumped into the air valve 20. The outer diameter of the neck 25 is relatively smaller than the outer diameter of the annular elastic collar 23 and the outer diameter of the elastic stop member 24. After insertion of the air valve 20 through a through hole on a wheel rim. (not shown), the annular elastic collar 23 and the elastic stop member 24 are respectively abutted against the inner and outer sides of the wheel rim.

The fastener 30 comprises a screw bolt 31 and a cushion ring 32. The screw bolt 31 is inserted through the cushion ring 32 and then threaded into the screw hole 221 of the air valve 20 to fasten the air valve 20 to the first mounting hole 14 or second mounting hole 15 of the sensor device 10, enabling the cushion ring 32 to be stopped between the head of the screw bolt 31 and the outer surface of the sensor device 10 around the first mounting hole 14 or second mounting hole 15.

Figure 4:
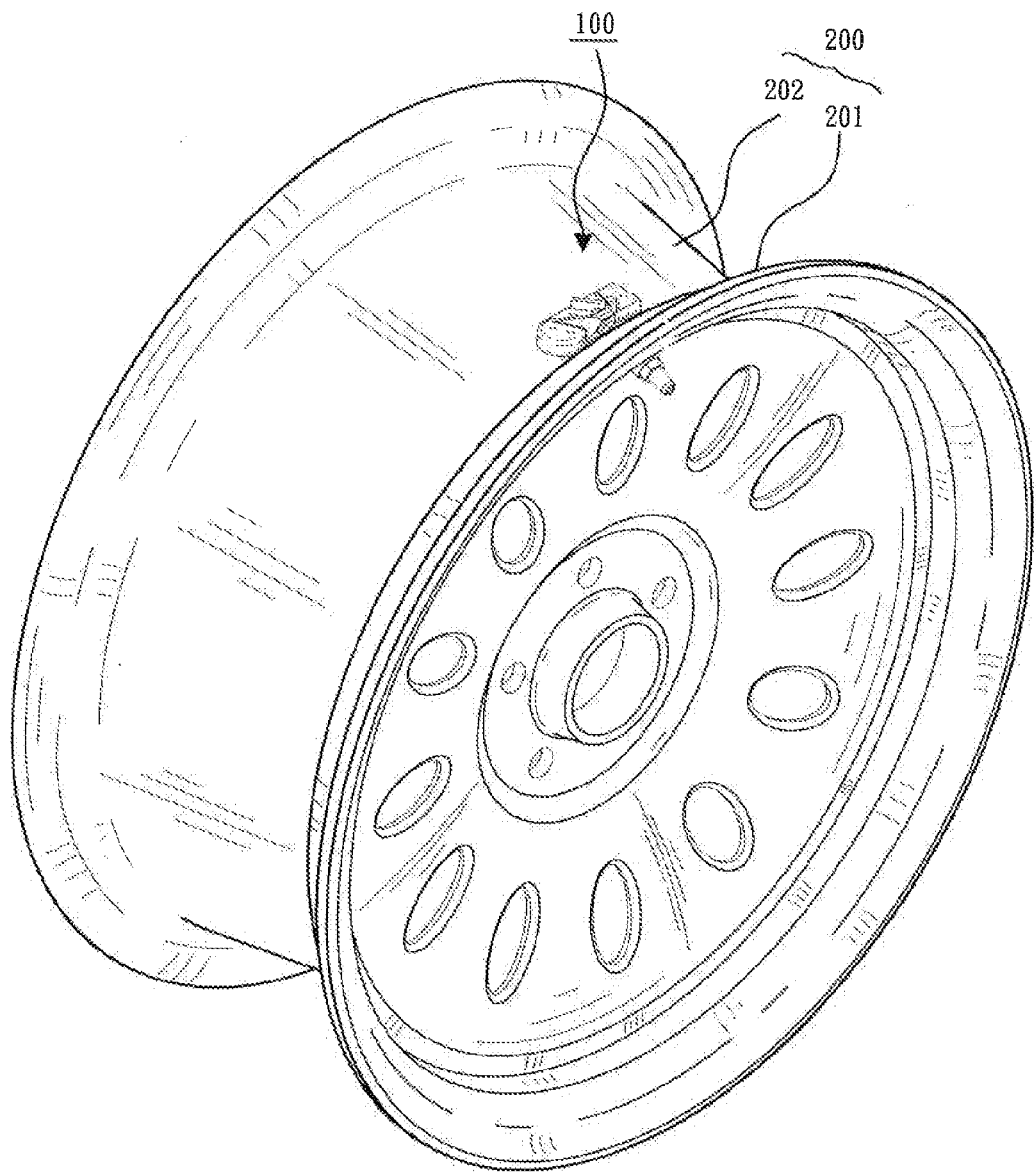
FIG. 4 is a schematic applied view of the present invention, illustrating the tire pressure sensor installed in a wheel rim for sedan.
Figure 5:
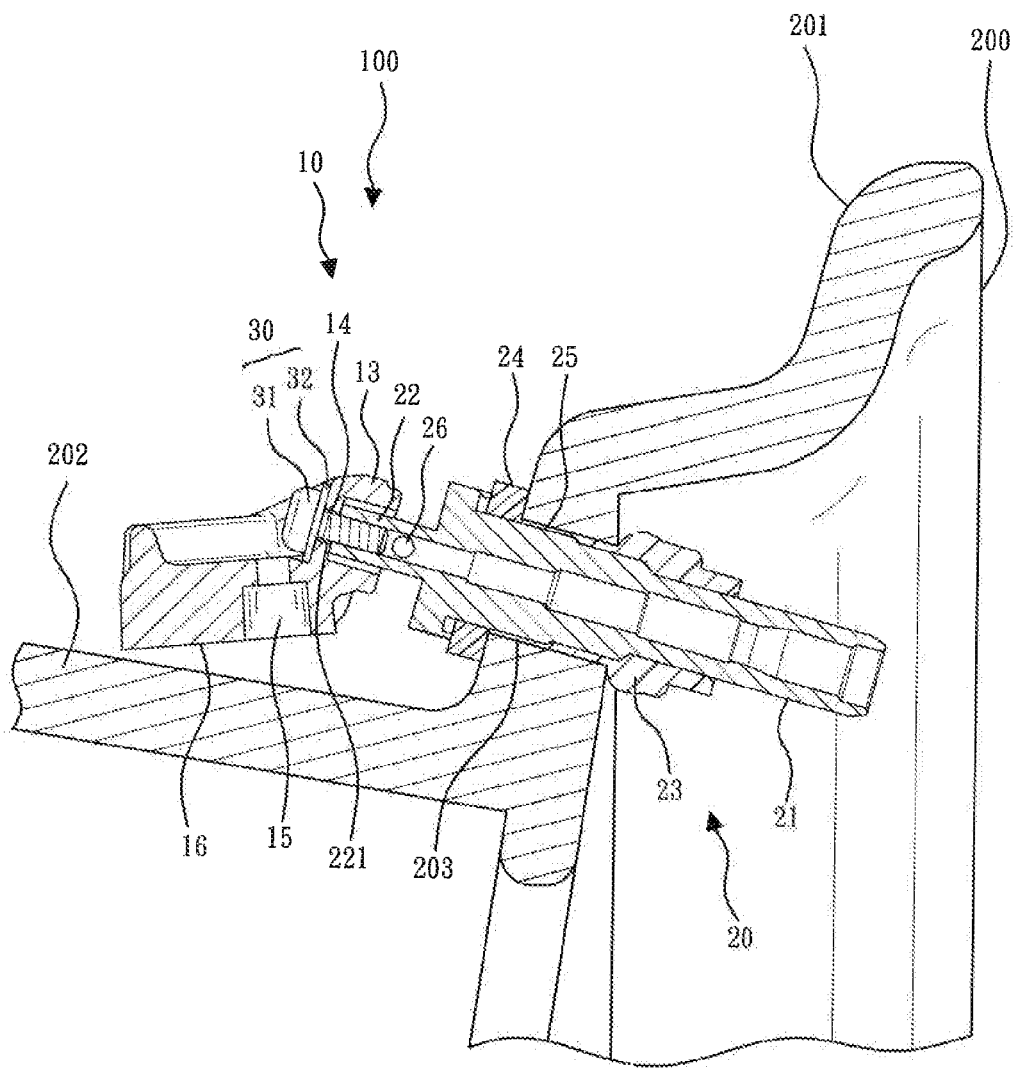
FIG. 5 is a sectional view of a part of FIG. 4.

FIGS. 4 and 5 illustrate an application example of the present invention. According to this application example, the tire pressure sensor 100 is installed in a wheel rim 200 for sedan. As illustrated, the wheel rim 200 defines two rim flanges 201 and a rim body 202 connected between the two rim flanges 201. The rim flanges 201 and the rim body 202 define a bearing surface area for holding a tire. The wheel rim 200 comprises a through hole 203 obliquely cut through the connection area between one rim flange 201 and the rim body 202. During installation of the present invention, insert the air valve 20 through the through hole 203 of the wheel rim 200 to keep the neck 25 in the through hole 203 and top have the elastic collar 23 and the elastic stop member 24 be respectively stopped at the opposing inner surface and outer surface the wheel rim 200, and then fasten the fastener 30 to the screw hole 221 of the air valve 20 to affix the air valve 20 to the first mounting hole 14 of the sensor device 10, keeping the air valve 20 in an inclined condition relative to the sensor device 10.

At this time, the tire pressure sensor 100 is firmly secured to the wheel rim 200 to keep the sensor device 10 in proximity to the wheel rim 200, avoiding accidental damage to the tire pressure sensor 100.

Figure 6:
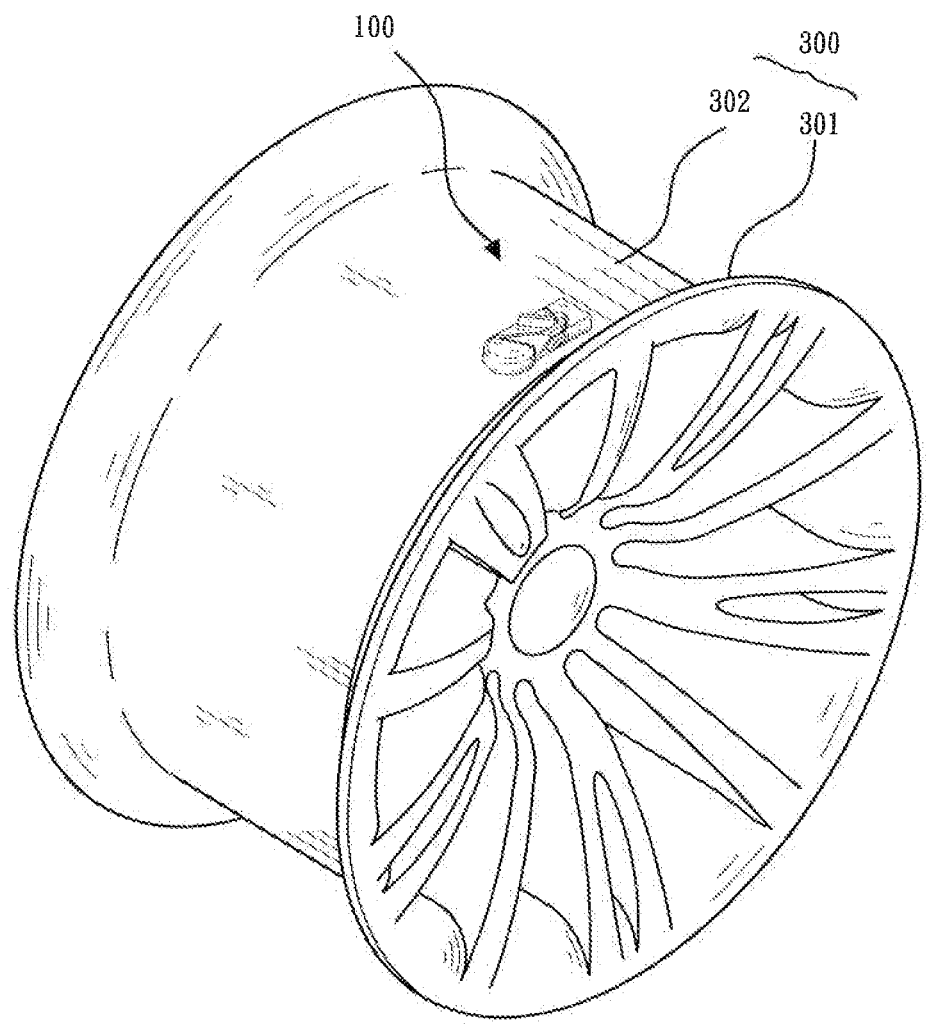
FIG. 6 is another schematic applied view of the present invention, illustrating the tire pressure sensor installed in a wheel rim for sports car.
Figure 7:
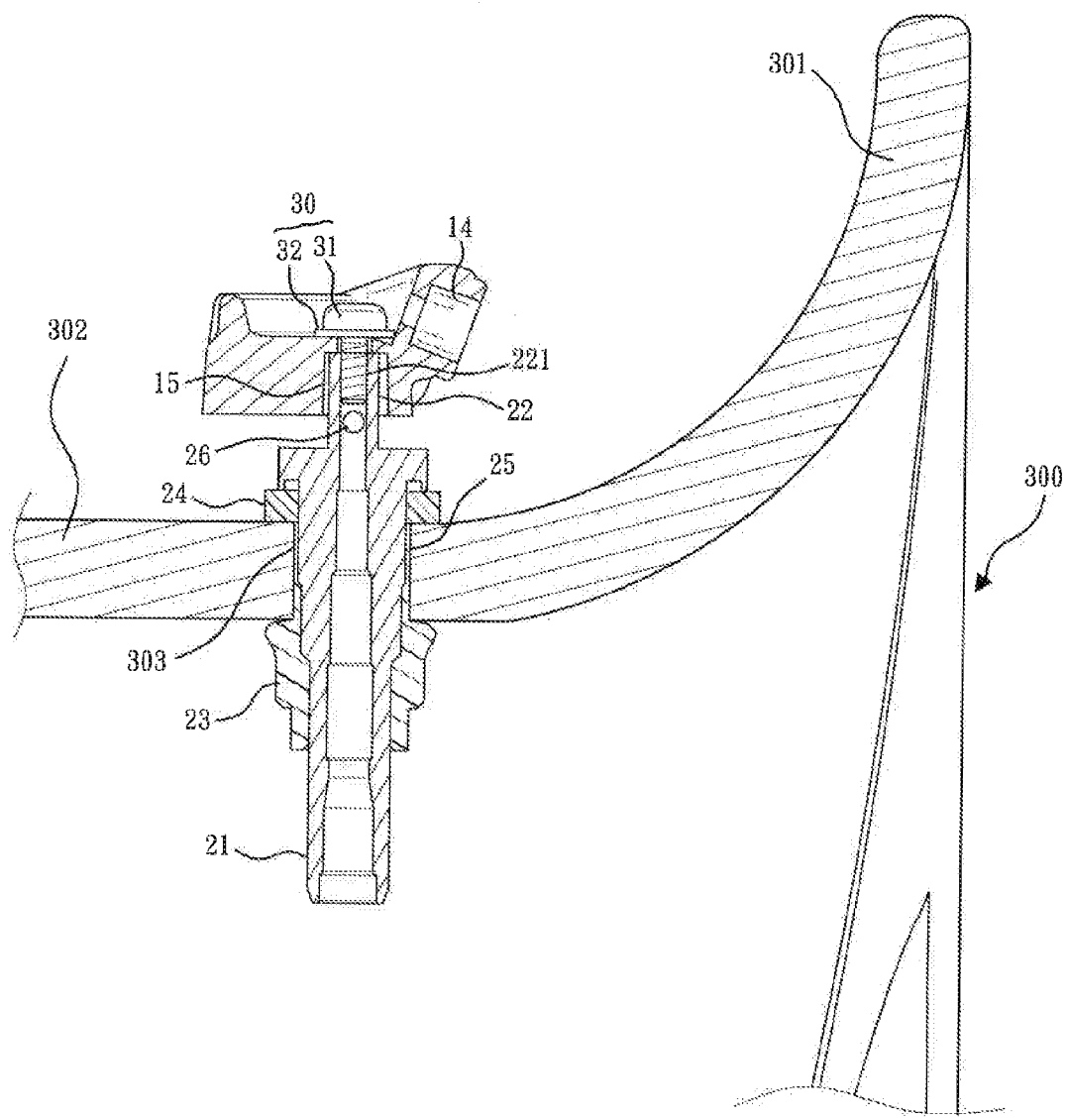
FIG. 7 is a sectional view of a part of FIG. 6.

FIGS. 6 and 7 illustrate another application example of the present invention. According to this application example, the tire pressure sensor 100 is installed in a wheel rim 300 for sports car. As illustrated, the wheel rim 300 defines two rim flanges 301 and a rim body 302 connected between the two rim flanges 301. The wheel rim 300 comprises a through hole 303 located in the rim body 302. During installation of the present invention, insert the air valve 20 through the through hole 303 of the wheel rim 300 to keep the neck 25 in the through hole 303 and to have the elastic collar 23 and the elastic stop member 24 be respectively stopped at the opposing inner surface and outer surface the wheel rim 300, and then fasten the fastener 30 to the screw hole 221 of the air valve 20 to affix the air valve 20 to the second mounting hole 15 of the sensor device 10, keeping the air valve 20 in a vertical manner relative to the sensor device 10. At this time, the tire pressure sensor 100 is firmly secured to the wheel rim 300 to keep the sensor device 10 in proximity to the wheel rim 200, avoiding accidental damage to the tire pressure sensor 100.

Figure 8:
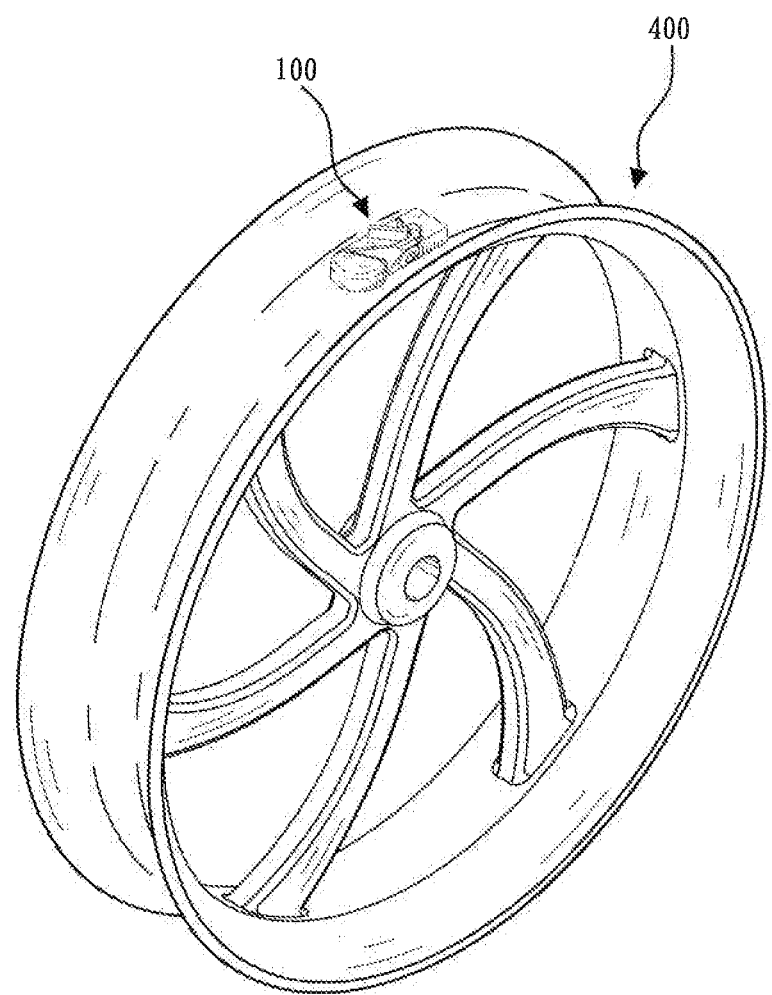
FIG. 8 is still another schematic applied view of the present invention, illustrating the tire pressure sensor installed in a wheel rim for motorcycle.

FIG. 8 illustrates still another application example of the present invention. According to this application example, the tire pressure sensor 100 is installed in a motorcycle wheel rim 400 for detecting the pressure of the tire.

In conclusion, subject to the relative installation angle between the sensor device 10 and the air valve 20, the tire pressure sensor 100 is applicable to different types of wheel rims.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A tire pressure sensor, comprising:
a sensor device for measuring the pressure of a tire, said sensor device comprising a first mounting hole and a second mounting hole, said first mounting hole and said second mounting hole respectively extending in a different angle, the axis of said first mounting hole and the axis of said second mounting hole defining a predetermined contained angle;
an air valve mountable in a through hole of a wheel rim, said air valve comprising an air intake tip and a tubular mounting rod respectively located at two opposite ends thereof, said air valve further comprising a neck located on a middle part thereof between said air intake tip and said tubular mounting rod, and an elastic collar and an elastic stop member mounted around the periphery thereof at two opposite sides of said neck between said elastic collar and said elastic stop member, said tubular mounting rod comprising an air hole transversely disposed adjacent to said elastic stop member in air communication with an inside space of said air intake tip; and
a fastener adapted to selectively fasten said tubular mounting rod of said air valve to one of said first mounting hole and said second mounting hole of said sensor device to hold said sensor device in one of two angular positions relative to said air valve.

2. The tire pressure sensor as claimed in claim 1, wherein said sensor device comprises a mounting frame protruded from a connection area between a top wall and a sidewall thereof; said first mounting hole is located in said mounting frame.

3. The tire pressure sensor as claimed in claim 2, wherein said first mounting hole extends obliquely through said top wall and said sidewall.

4. The tire pressure sensor as claimed in claim 1, wherein said second mounting hole extends through a connection area between a top wall and a sidewall of said sensor device.

5. The tire pressure sensor as claimed in claim 1, wherein said predetermined contained angle defined between the axis of said first mounting hole and the axis of said second mounting hole is smaller than 90-degrees.

6. The tire pressure sensor as claimed in claim 1, wherein said air valve comprises a screw hole located at a distal end of said tubular mounting rod; said fastener comprises a screw bolt fastenable to said screw hole of said air valve to selectively affix said air valve to one of said first mounting hole and said second mounting hole of said sensor device.

7. The tire pressure sensor as claimed in claim 1, wherein said fastener further comprises a cushion ring mounted around said screw bolt and stoppable outside said sensor device around one end of one of said first mounting hole and said second mounting hole.

8. The tire pressure sensor as claimed in claim 1, wherein said tubular mounting rod is non-circular.

\* \* \* \* \*